United States Patent [19]

DeBisschop et al.

[11] Patent Number: 5,560,257
[45] Date of Patent: Oct. 1, 1996

[54] SEPARABLE CONNECTING DEVICE FOR A STEERING COLUMN

[75] Inventors: Mark J. DeBisschop, Thomaston; Kevin J. Audibert, Wolcott, both of Conn.

[73] Assignee: The Torrington Company, Torrington, Conn.

[21] Appl. No.: 259,583

[22] Filed: Jun. 14, 1994

[51] Int. Cl.$^6$ ..................... B62D 1/19
[52] U.S. Cl. ..................... 74/492; 403/2
[58] Field of Search ............. 74/492; 180/777; 403/2, 378

[56] References Cited

U.S. PATENT DOCUMENTS

| | | | |
|---|---|---|---|
| 3,298,409 | 1/1967 | Elson | 143/159 |
| 3,468,181 | 9/1969 | Millar | 74/492 |
| 3,600,971 | 8/1971 | Scarvelis | 74/492 |
| 3,980,805 | 9/1976 | Lipari | 403/378 |
| 4,098,141 | 7/1978 | Yamaguchi | 74/492 |
| 4,106,311 | 8/1978 | Euler | 74/492 |
| 4,117,741 | 10/1978 | Yazane et al. | 74/492 |
| 4,411,167 | 10/1983 | Mohr | 74/492 |
| 4,627,761 | 12/1986 | Olson et al. | 403/378 |
| 4,647,241 | 3/1987 | Weber | 403/378 |
| 4,767,233 | 8/1988 | Erickson | 403/378 |
| 4,968,058 | 11/1990 | Jones | 280/777 |
| 5,115,691 | 5/1992 | Beauch | 74/493 |
| 5,228,720 | 7/1993 | Sato et al. | 74/492 |
| 5,342,091 | 8/1994 | Hancock | 74/492 |

FOREIGN PATENT DOCUMENTS

| | | |
|---|---|---|
| 0124995A1 | 11/1984 | European Pat. Off. . |
| 2205149 | 11/1988 | United Kingdom . |

OTHER PUBLICATIONS

Product Engineering, vol. 29, No. 31, 4 Aug. 1958, pp. 60–61, Frederico Strasser, '13 ways to Couple Shafts', see example 5.

*Primary Examiner*—Charles A. Marmor
*Assistant Examiner*—David Fenstermacher
*Attorney, Agent, or Firm*—Michael H. Minns

[57] ABSTRACT

An intermediate shaft consisting of a solid inner shaft member slidable within a tube member. A C-shaped connecting member or clip is inserted into a pair of opposed holes in tube member. The ends of connecting member engage a shoulder on the shaft member to prevent the two portions (the shaft member and the tube member) of the intermediate member from disengaging. The shaft member and the tube member are slidable relative to one another to accommodate movement of the front axle and the steering gear mechanism.

11 Claims, 4 Drawing Sheets

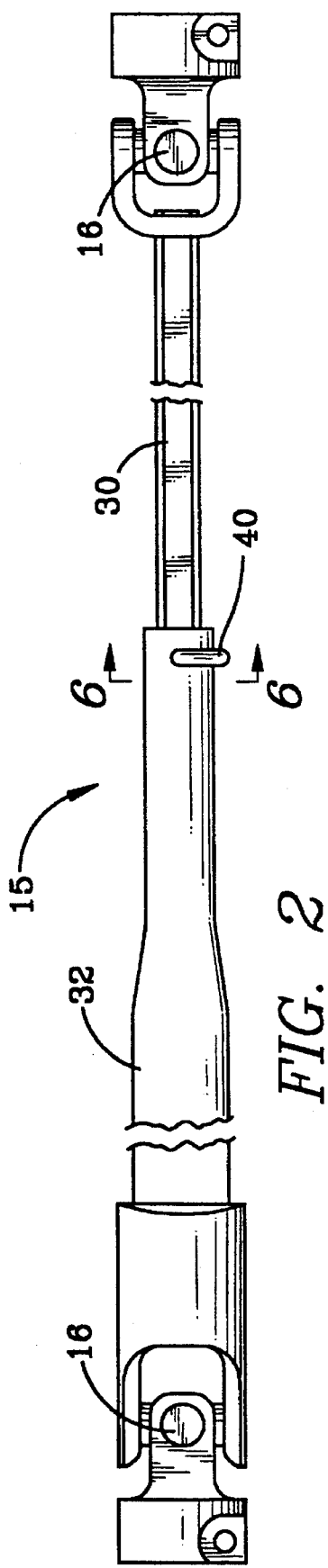
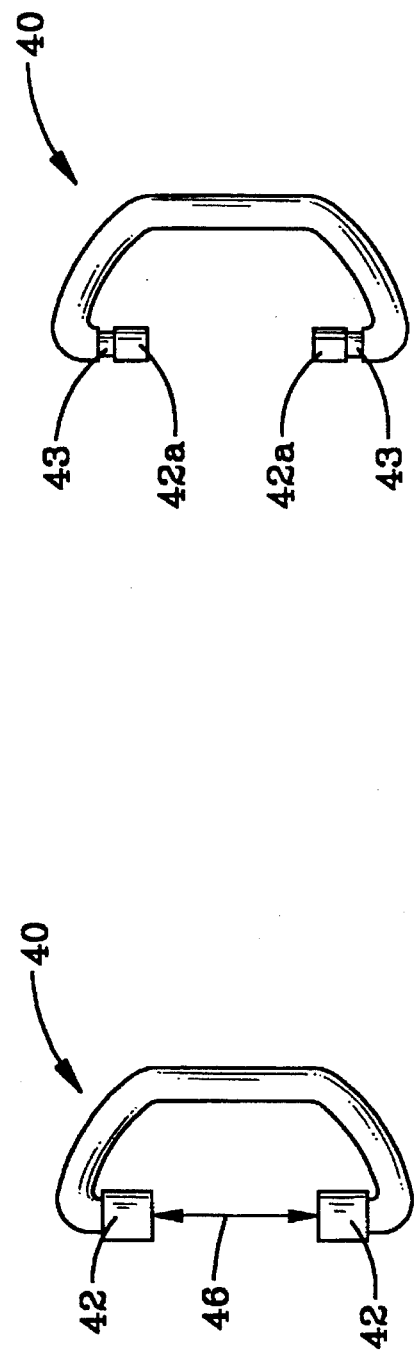

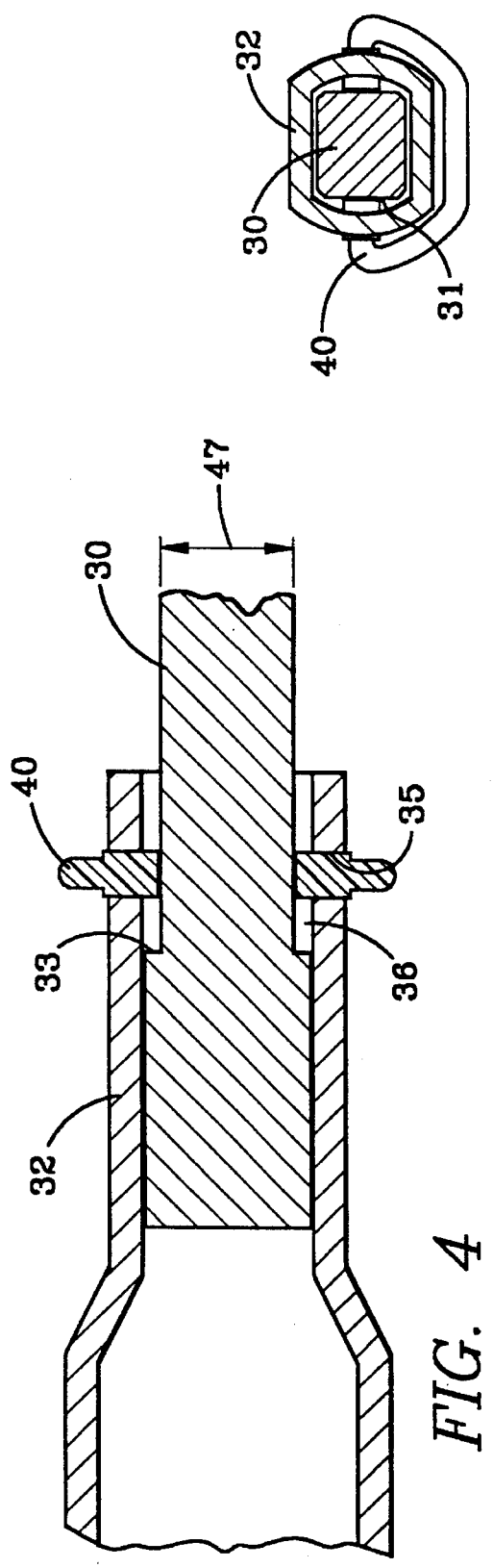
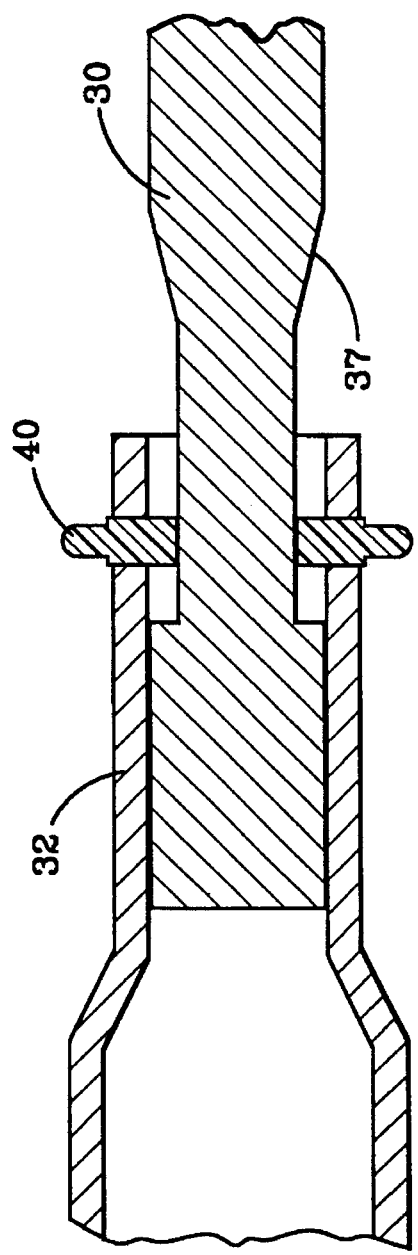

5,560,257

SEPARABLE CONNECTING DEVICE FOR A STEERING COLUMN

BACKGROUND OF THE INVENTION

This invention relates generally to steering columns and more particularly to motor vehicle steering columns which are separable in the event of impact.

When a motor vehicle is subjected to a front impact, the steering column and the steering wheel of the vehicle have a dangerous tendency to be displaced toward the driver. To protect the driver from impact with the steering wheel, air bags are sometimes provided to cushion the driver from impact with the steering wheel. To assure proper performance of the air bag, it is necessary for the steering wheel to remain in its original orientation.

In some vehicles, such as the one illustrated in FIG. 1, the steering gear box 14, during impact, is driven downwards, as shown by arrow A. When a rigid or non-separable steering column is used, the downward movement of the steering gear box 14 can cause the steering column 11 to move or pivot upwards as shown by arrow B. The steering wheel can move far enough such that the effectiveness of the air bag is reduced.

The foregoing illustrates limitations known to exist in present steering columns. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a separable shaft assembly comprising: a tube member, the tube member having at least one aperture therethrough; a shaft member slidable within the tube member, the shaft member having a shoulder portion; and a removable connecting member, the connecting member having at least one end extending through said tube member at least one aperture, the connecting member at least one end interengaging the shaft member shoulder portion, the connecting member at least one end being sheared off by the shaft member shoulder portion when a predetermined force is applied substantially along an axis common to the tube member and the shaft member.

The foregoing and other aspects will become apparent from the following detailed description of the invention when considered in conjunction with the accompanying drawing figures.

BRIEF DESCRIPTION OF THE DRAWING FIGURES

FIG. 2 is a side view of a steering intermediate shaft embodying the present invention;

FIG. 3 is a side view of one embodiment of the connecting clip shown in FIG. 2;

FIG. 3A is a side view of a second embodiment of the connecting clip;

FIG. 4 is a cross-sectional side view of a portion of the intermediate shaft shown in FIG. 2;

FIG. 5 is a cross-sectional side view of a portion of an intermediate shaft showing an alternate embodiment of the shaft member;

FIG. 6 is a cross-sectional view taken on line 6—6 of FIG. 2; and

DETAILED DESCRIPTION

Figure 1:
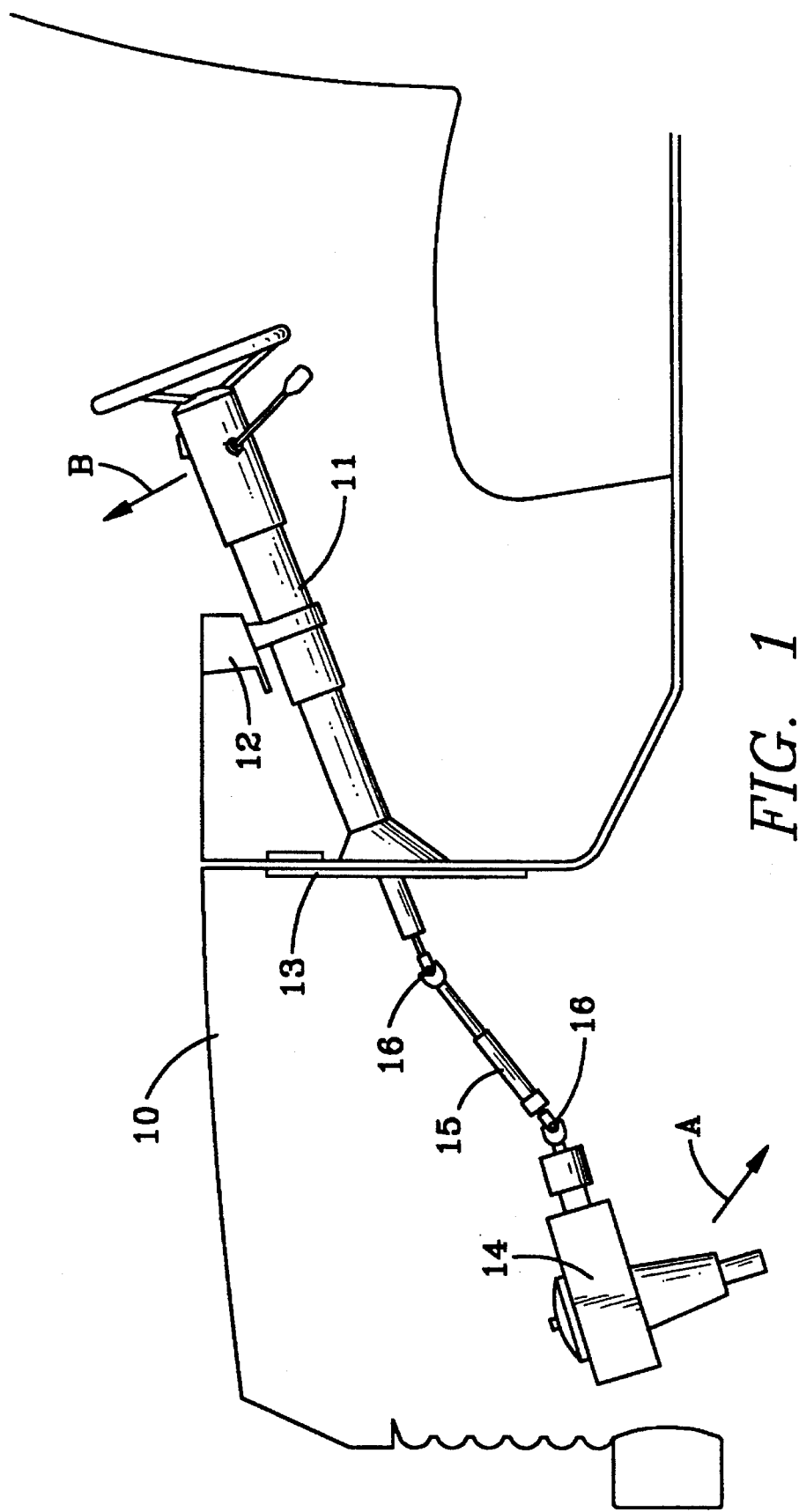
FIG. 1 is a fragmentary view of a vehicle illustrating the general elevational arrangement of the steering linkage for such a vehicle.

As shown in FIG. 1, a vehicle 10 typically has a steering column 11 mounted upon a bracket 12 which is either part of the dashboard (as shown) or part of the fire wall 13. The lower portion of the steering column 11 is connected to the steering gear mechanism 14 by way of a separable intermediate shaft assembly 15 having universal joints 16 at both ends. During a front-end collision, the primary impact may force the steering gear mechanism 14 downwards in the direction of arrow A. This forces the steering column 11 to tilt or pivot in the direction of arrow B. To prevent the tilting of steering column 11, the intermediate shaft 15 is provided with a removable connecting member or clip 40 which allows the intermediate shaft 15 to separate into two portions, a tube member 32 and a shaft member 30.

FIG. 2 shows an intermediate shaft 15 consisting of a solid inner shaft member 30 slidable within a tube member 32. A C-shaped connecting member or clip 40 is inserted into a pair of opposed holes 35 in tube member 32. The ends 42 of the connecting member 40, as shown in FIG. 4, engage a shoulder 33 on shaft 30 to prevent the two portions 30, 32 of the intermediate shaft 15 from disengaging. The shaft 30 and tube 32 are slidable relative to one another to accommodate movement of the front axle (not shown) and the steering gear mechanism 14 attached thereto relative to the frame of the vehicle. Since the steering column 11 is fixed relative to the frame, the steering gear mechanism 14 moves relative to the steering column 11. The slidable movement of the portions of the intermediate shaft 15 is needed to accommodate this movement and is sometimes needed to shorten the shaft 15 during installation. The shaft 30 has a general double-D shape, except for the portion adjacent connecting member 40. The rounded portions of the double-D have been removed to provide flat surfaces 31, shown in FIG. 6, for sliding contact with ends 42.

To allow separation of the intermediate shaft 15 during impact, the shoulder 33 impacts the ends 42 of the connecting member 40 shearing the ends 42 off, thereby permitting the two portions 30, 32 of the intermediate shaft 15 to separate.

Preferably, the connecting member 40 is a C-shaped member as shown in FIG. 3. The preferred material for clip 40 is Celcon® M-90, an acetal copolymer, supplied by Celanese Corporation. The ends 42 of the clip 40 are enlarged relative to the balance of the clip 40. The ends 42 are enlarged to provide the desired predetermined shear force. For the intermediate shaft shown in FIGS. 2 and 4, this predetermined force is 300 lbf. The enlarged ends 42 of the clip 40 extend into and through the apertures 35. This assures that the shearing of the clip will occur in the enlarged ends 42. The diameter of the ends 42 can be changed along with the type of plastic to provide other predetermined shear forces. The diameter of the body of clip 40 is smaller than the diameter than the ends 42 to provide a small amount of resilience to the clip 40. As assembled, the spacing 46 between the clip ends 42 is slightly smaller than the distance 46 from one side of shaft 30 to the other side of shaft 30. The resilience of the body of clip 40 biases the ends 42 into contact with shaft 30. The resilience of clip 40 also permits the ends 42 to be spread apart if it desired to manually disassemble the intermediate shaft 15. As installed, a small gap 36, approximately one-half inch, is provided between the shoulder 33 and the end 42 of clip 40. This gap 36 permits the two intermediate shaft portions 30, 32 to slide in both directions relative to one another.

An alternate embodiment of the clip 40 is shown in FIG. 3A. A groove or weakened portion 43 is provided adjacent the ends 42a. The size of the groove 43 can be varied to provide differing predetermined shear forces. Steel, rather than plastic, might be used for the clip shown in FIG. 3A.

An alternate embodiment of intermediate shaft 15 is shown in FIG. 5. This embodiment could be used for an intermediate shaft having a high predetermined separation force. For example, using an all metal clip 40 without any grooves or weakened portions would significantly increase the separation force. Such a stiff clip 40 can increase the loading on the shaft member 32 and also unacceptably increase the collapse loading of the intermediate shaft 15. To prevent this, a ramp portion 37 is provided on shaft 30. This ramp 37 permits the clip 40 to be spread apart when the steering column 11, including intermediate shaft 15, collapses. By using the ramp 37, the stiffer clip 40 does not have an unacceptable effect on the collapse load of the intermediate assembly 15. The ramp 37 also spreads the ends 42 of the clip 40 apart when manually disassembling the intermediate shaft 15.

Figure 7A:
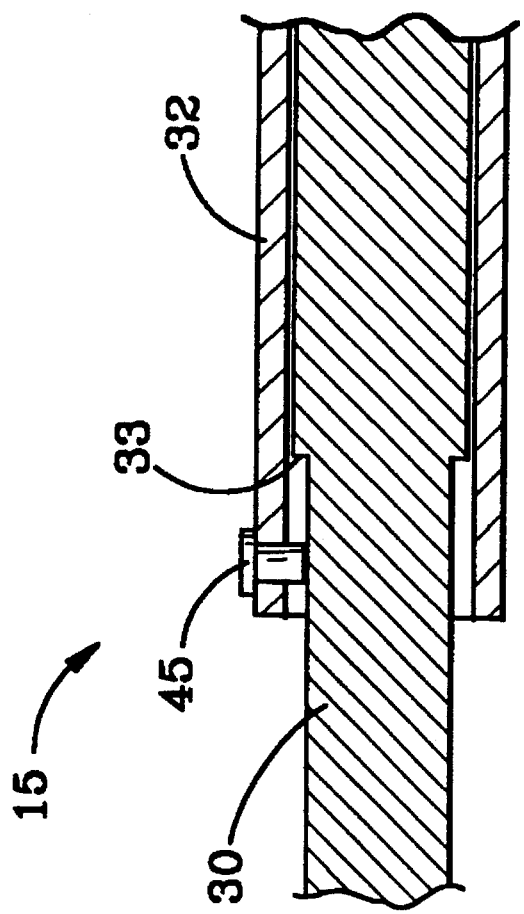
FIGS. 7 and 7A are cross-sectional views of another embodiment of the connecting clip.
Figure 7:
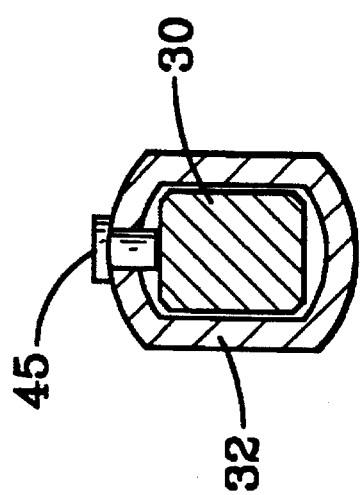

FIGS. 7 and 7A show another embodiment of intermediate shaft 15. Preferably, a single aperture 35 is provided in tube member 32. A single press fit pin 45 functions as the connecting clip for the two portions 30, 32 of the intermediate shaft 15. Pin 45 may or may not be in sliding contact with surface 31 of shaft member 30. As described above, shoulder portion 33 of shaft 30 contacts pin 45 during an impact. When a predetermined force is exceeded, the end of pin 45 shears off, allowing the intermediate shaft 15 to separate.

Having described the invention, what is claimed is:

1. A separable shaft assembly comprising:
   a tube member, the tube member having at least one aperture therethrough;
   a shaft member slidable within the tube member, the shaft member having a shoulder portion; and
   a removable connecting member, the connecting member having at least one end extending through said tube member at least one aperture, the connecting member at least one end interengaging the shaft member shoulder portion, the connecting member at least one end being sheared off by the shaft member shoulder portion when a predetermined force is applied substantially along an axis common to the tube member and the shaft member, the connecting member being removable as a unitary structure from the tube member without the at least one end being sheared off, the connecting member slidably engaging the shaft member, the shaft member being slidable with respect to the tube member while the connecting member slidably engages the shaft member.

2. The separable shaft assembly according to claim 1, wherein the connecting member is a C-shaped member, the number of tube member apertures is two and the number of connecting member ends is two.

3. The separable shaft assembly according to claim 2, wherein the connecting member is plastic.

4. The separable shaft assembly according to claim 2, wherein each end of the connecting member has a groove thereabout.

5. The separable shaft assembly according to claim 1, wherein the at least one end of the connecting member has a weakened portion, the shearing of the connecting member at least one end occurring in the weakened portion.

6. The separable shaft assembly according to claim 1, wherein the number of connecting member ends is two and the distance between the connecting member ends, when in the free state, is less than the width of the shaft member, the width of the shaft member being from where the one connecting member end contacts the shaft member to where the other connecting member end contacts the shaft member.

7. The separable shaft assembly according to claim 1, wherein the connecting member has a first cross-sectional area and the at least one connecting member end has a second cross-sectional area, the second cross-sectional area being greater than the first cross-sectional area.

8. The separable shaft assembly according to claim 1, wherein the connecting member is a pin press fit into the at least one tube member aperture.

9. A separable shaft assembly comprising:
   a tube member, the tube member having two apertures therethrough;
   a shaft member slidable within the tube member, the shaft member having a shoulder portion; and
   a removable connecting member, the connecting member having two ends extending through the tube member apertures, the connecting member ends being resiliently biased into contact with the shaft member, the connecting member ends interengaging the shaft member shoulder portion, the connecting member ends being sheared off by the shaft member shoulder portion when a predetermined force is applied substantially along an axis common to the tube member and the shaft member, the connecting member being removable as a unitary structure from the tube member without the connecting member ends being sheared off, the connecting member slidably engaging the shaft member, the shaft member being slidable with respect to the tube member while the connecting member slidably engages the shaft member.

10. The separable shaft assembly according to claim 9, wherein the connecting member is a C-shaped member.

11. A separable shaft assembly comprising:
    a tube member;
    a shaft member slidable within the tube member;
    a removable shearable means for connecting the tube member and the shaft member, the removable shearable means permitting sliding movement of the tube member relative to the shaft member, the removable shearable means preventing the separation of the tube member and the tube member in a first direction substantially along an axis common to the tube member and the shaft member until a force being applied in the first direction exceeds a predetermined minimum, the removable shearable means being sheared off when the force exceeds the predetermined minimum, thereby permitting separation of the shaft member and the tube member, the shearable means being removable as a unitary structure from the tube member without the shearable means being sheared off, the connecting member slidably engaging the shaft member, the shaft member being slidable with respect to the tube member while the connecting member slidably engages the shaft member.

* * * * *